Patented Mar. 25, 1930

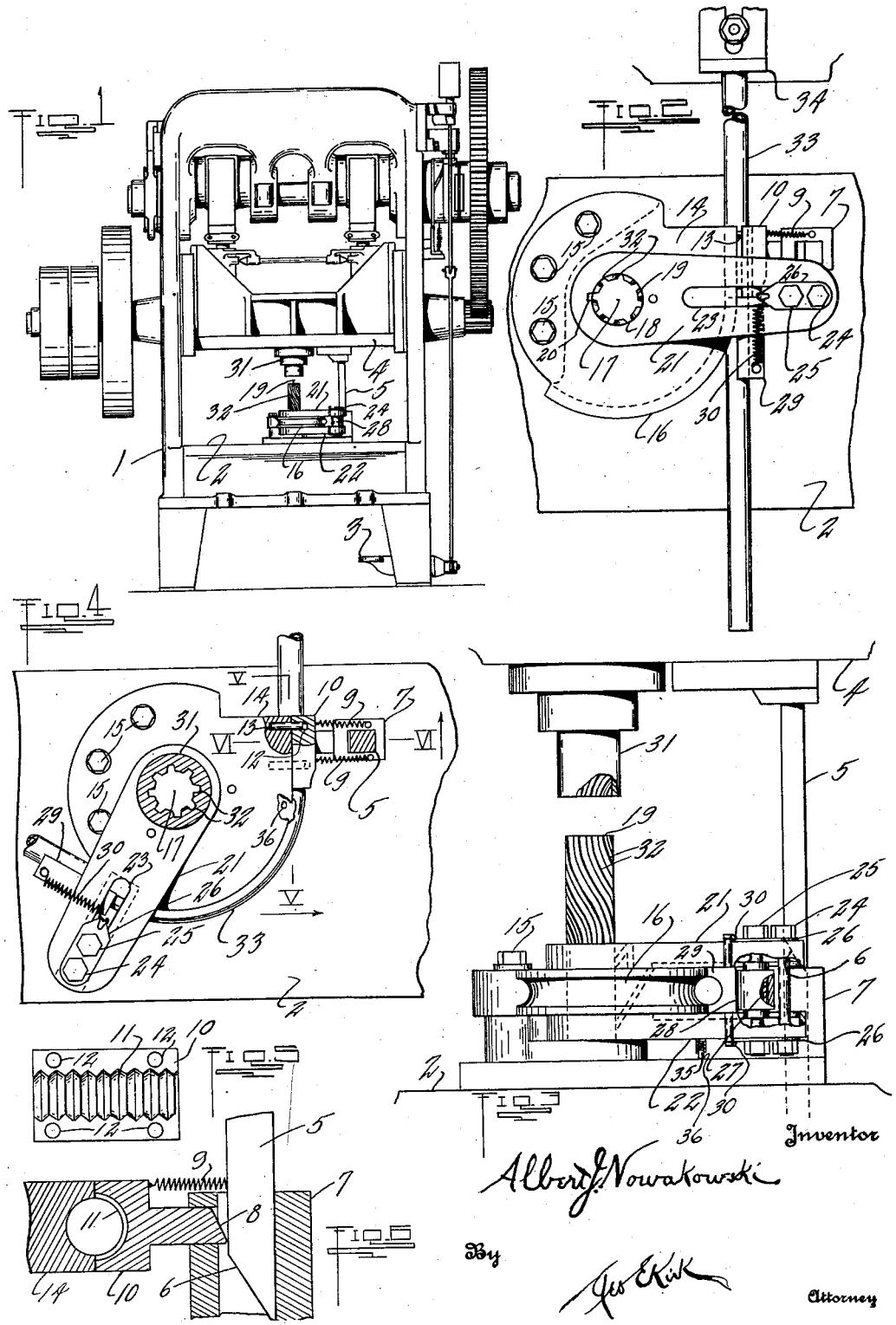

1,751,492

UNITED STATES PATENT OFFICE

ALBERT J. NOWAKOWSKI, OF TOLEDO, OHIO, ASSIGNOR TO THE TOLEDO STEEL TUBE COMPANY, OF TOLEDO, OHIO, A CORPORATION OF OHIO

BENDER

Application filed October 3, 1927. Serial No. 223,622.

This invention relates to bending, especially of metal stock.

This invention has utility when incorporated in power operated equipment for imparting definite curves in bending pipes or tubes.

Referring to the drawings:

Fig. 1 is a side elevation of an embodiment of the invention as adapted to a punch press;

Fig. 2 is a plan view of a portion of the bender as mounted on the bed plate of the press of Fig. 1, parts being broken away;

Fig. 3 is a side elevation, on an enlarged scale, of the device as incorporated in the punch press of Fig. 1;

Fig. 4 is a fragmentary plan view of the device of Fig. 2 in bend effected position;

Fig. 5 is a detail view on the line V—V, Fig. 4, looking into the clamp; and

Fig. 6 is a section on the line VI—VI, Fig. 4.

Punch press 1 is shown as having bed plate 2, trip treadle 3 operable for effecting a cycle of reciprocation of crosshead 4. This crosshead 4 has fixed therewith depending stem 5 carrying cam face 6. This cam face 6 passes by way of guide 7 to engage complementary cam or wedge face 8, for shifting such laterally of the travel of this stem 5 and against the resistance of springs 9. Fixed with the cam 5 is clamp block 10 having engaging teeth or gripping jaw 11. This clamp 10 is provided with openings 12 in which guide pins 13, as fixed with main block 14, may slide. This main block 14 is anchored by bolts 15 with the bed plate 2 and provides an inner die face 16 herein shown as a bending arc face of a constant radius from axis 17. This block or fixed die member provides bearing 18 coaxial with the axis 17. In this bearing 18 is mounted stem 19 having fixed therewith by keys 20, a pair of arms 21, 22, extending in a common direction from the stem 19. These arms 21, 22, each has a radially extending slot 23 through which may extend bolts 24, 25, for clamp plates 26 therewith. The bolt 25 has anti-friction rollers 27 thereon as a mounting for roller 28 backing shoe 29 as outer opposing die member yieldably drawn by springs 30 into position between the arms 21, 22, for engagement with the roller 28.

Fixed with the crosshead 4 is internally threaded actuator 31 in alignment with externally threaded stem 32 as the upper portion of the stem 19. The threads on the nut 31 are in position for registry with the threads 32 of the stem 19 as the crosshead 4 descends toward the bed plate 2. In this initial descent toward this registering position, the stem 5 has had its cam approach to effect gripping action of the clamp 10 upon article of work as positioned against fixed stop 34. The continued descent of the crosshead 4, as tripped for operation by the treadle 3, causes a rotation of the stem 19 with its arms 21, 22, in the bearing 18 relatively to the inner die 16 thus causing the shoe 29 to ride away from the clamp 10 and by continuous arc travel operation bend the pipe 33, as tubular stock, into the inner die 16 for the desired arc extent as determined in the setting operation and the radius as determined by the die 16. The continued cycle of operation of the crosshead 4 is upward away from the table 2 effecting first a swinging of the arms 21, 22, back to initial position with the shoe 29 adjacent the clamp 10 at which position the arms are yieldably held by spring plunger 35 riding into seat 36 fixed with the bed plate 2. The springs 30 yieldably reset this shoe 29, while the springs 9 retract the clamp 10, and the device is accordingly in position for withdrawal of the bent pipe 33 and insertion of another pipe for a repetition of this cycle of operations.

What is claimed and it is desired to secure by United States Letters Patent is:—

1. A bending machine embodying an inner die having an arc seat, an outer relatively movable shoe, a pair of radially extending arms embracing the die and mounting the shoe, a clamp for positioning the stock to be bent with the inner die at one point, and an actuator for rendering the clamp effective and for additionally effecting through the arms the relative shifting of the shoe as to the inner die.

2. A bending machine embodying an inner die having an arc seat, an outer relatively movable shoe, a pair of radially extending arms embracing the die and mounting the shoe, a clamp for gripping the stock to be bent with a portion of the inner die, and an actuator for rendering the clamp effective and for additionally effecting through the arms relative swinging of the shoe from said clamp along said inner die.

3. A bending machine embodying an inner die having an arc seat of common radial extent from a center, an outer relatively movable shoe having bearing at said center and a stem therefrom, a clamp for positioning the stock to be bent with the inner die at one point, and an actuator reciprocable axially of said center for effecting relative swinging of the shoe from said clamp along said inner die.

4. A bending machine embodying an inner die having an arc seat of common radial extent from a center, an outer relatively movable shoe having bearing at said center and a threaded stem therefrom, a clamp for posing the stock to be bent with the inner die at one point, and a complementary threaded plunger reciprocable to oscillate said stem.

5. A bending machine embodying an inner die having an arc seat of common radial extent from a center, an outer relatively movable shoe having bearing at said center and a threaded stem therefrom, a clamp for positioning the stock to be bent with the inner die at one point, and a complementary threaded plunger reciprocable toward and upon said stem to set said clamp and swing said shoe and away from said stem to reset said shoe and release said clamp.

6. A bending machine embodying an inner die having a seat of the desired contour, an outer relatively movable shoe, an arm for the shoe, a clamp for positioning the stock to be bent with the inner die at one point, and an actuator for effecting the relative shifting of the shoe as directed by said arm and additionally having a wedge therefrom for seating the clamp.

7. A bending machine embodying an inner die having a seat of the desired contour, an outer relatively movable shoe, an arm for the shoe, an anti-friction roller carried by the arm for engaging the shoe, a shiftable mounting permitting release of the shoe, a catch for holding the shoe adjacent the clamp against release, and a trip for the catch.

In witness whereof I affix my signature.

ALBERT J. NOWAKOWSKI.